United States Patent

Ochiai

[15] 3,705,748
[45] Dec. 12, 1972

[54] CONTROL SYSTEM FOR PREVENTING THE SKIDDING OF VEHICLES

[72] Inventor: Takeshi Ochiai, Toyota, Japan

[73] Assignee: Toyota Jidosha Kabushiki Kaisha, Toyota-shi, Japan

[22] Filed: April 3, 1970

[21] Appl. No.: 25,436

[30] Foreign Application Priority Data

Oct. 20, 1969 Japan..................................44/83758
Oct. 20, 1969 Japan..................................44/99575

[52] U.S. Cl............303/21 BE, 188/181 C, 303/21 F
[51] Int. Cl. .................................................B60d 8/08
[58] Field of Search ...188/181; 303/20, 21; 307/120, 307/121; 317/5; 324/160, 161, 162; 340/262, 263

[56] References Cited

UNITED STATES PATENTS

| | | |
|---|---|---|
| 3,245,213 | 4/1966 | Thompson et al.................303/21 EB |
| 3,467,444 | 9/1969 | Leiber ...........................188/181 A X |
| 3,441,320 | 4/1969 | Flory...................................303/21 B |
| 3,547,501 | 12/1970 | Harned et al......................303/21 BE |
| 3,482,887 | 12/1969 | Sheppard..........................303/21 BE |
| 3,498,682 | 3/1970 | Mueller et al. ....................303/21 BE |
| 3,582,152 | 6/1971 | Burckhardt et al. ........303/21 BE UX |

*Primary Examiner*—George E. A. Halvosa
*Assistant Examiner*—Stephen G. Kunin
*Attorney*—Cushman, Darby & Cushman

[57] ABSTRACT

Equipment for of preventing the skidding of vehicles by detecting the speed of wheel rotation, comparing the detected speed with a set reference value of the deceleration characteristics, controlling the wheel rotation by suitably effecting three kinds of braking pressure operations, namely decreasing, maintaining and increasing the braking pressure, in response to the results of the aforesaid comparison, and renewing the reference speed value to be newly set when the wheel speed exceeds the previous set reference value by a predetermined amount, and an apparatus for modulating the wheel braking pressure at a required value adapted to driving conditions.

6 Claims, 11 Drawing Figures

INVENTORS
TAKESHI OCHIAI

BY Cushman, Darby & Cushman
ATTORNEYS

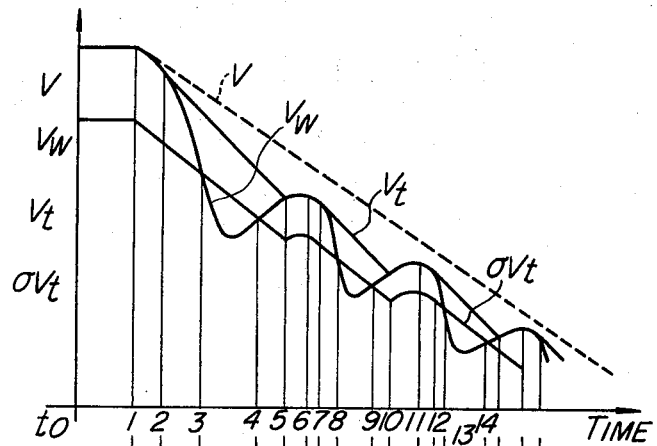
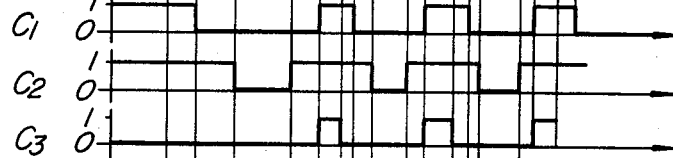
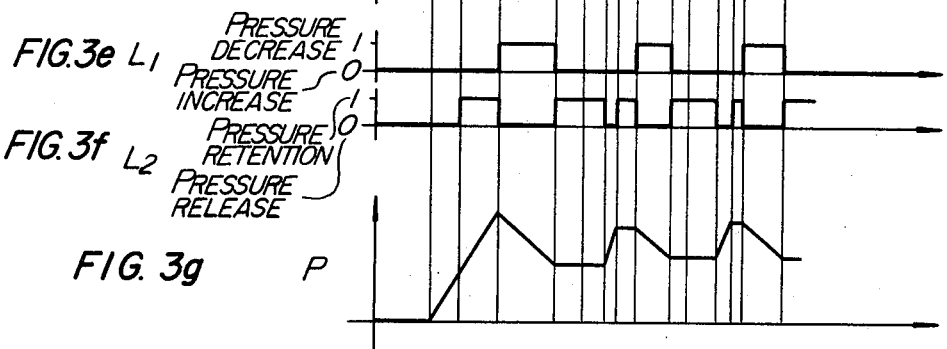

CONTROL SYSTEM FOR PREVENTING THE SKIDDING OF VEHICLES

BACKGROUND OF THE INVENTION

1. Field of the Invention

This invention relates to a method of preventing the skidding of vehicles to prevent a running vehicle from loosing a directional control and the spinning of the vehicle body due to the locking of the vehicle wheels caused by applying a braking force to a running vehicle, and it also refers to a wheel braking pressure modulator for modulating a hydraulic wheel braking pressure at a required value adapted to driving conditions of the vehicle body which change from time to time.

2. Description of the Prior Art

Anti-skid methods heretofor contemplated and practiced include the one in which a braking force is applied and released on the basis of the detection of deceleration or acceleration of the vehicle wheels to prevent locking thereof, and the one, in which the speed of wheel rotation is controlled on the basis of the results of computation of the actual vehicle speed carried out by utilizing a deceleration detector and the like. By the former method, changes in the speed of wheel rotation are large and sudden, so that passengers in the car are made to feel very uncomfortable. The latter method involves a deceleration detector possessing a complicated construction and of high cost and may result in occassional errors due to the slopes of roads and the turning posture of the vehicle itself.

SUMMARY OF THE INVENTION

An object of the invention is to provide equipment for preventing the skidding of vehicles by means of an arrangement including a rotational speed detector, a charging and discharging circuit consisting of a diode, a capacitor, resistors, three comparators respectively connected to associated logic circuits and two coils for the ON-OFF operation of the respective electromagnetic valves of a hydraulic braking pressure modulator, which effects three kinds of braking pressure operations by making the hydraulic braking pressure rise or fall substantially linearly when the braking pressure is increased or decreased and by maintaining the braking pressure of a value of that time constant during the maintaining operation through switching over or closing air passages so as to control the speed of the rotation of the wheels.

Another object of the invention is to provide a wheel braking pressure modulator, which is capable of selectively supplying an external electric control pattern of signals which are most suitable for the braking operation by the above method according to the present invention and is possible to manufacture at a comparatively low cost.

One of the features of the invention is the possibility of controlling the braking pressure when an vehicle travels along a road having any value of coefficient of friction whereby the increasing process of the speed of rotation of the vehicle wheels in continuously detected by the detecting circuit detecting the charging of the capacitor and maintaining the value of the hydraulic pressure at that time until the vehicle wheel speed goes up near the actual speed of the vehicle, whereupon the renewal of a reference voltage is automatically carried out.

The second feature of the invention is that control can be accomplished effectively, even if the coefficient of friction of the road surface changes during braking operation, because the reference voltage is then automatically renewed.

The third feature of the invention is the incorporation of the function of maintaining the hydraulic pressure, whereby the change of the hydraulic pressure may be reduced as compared with the conventional antiskid apparatus provided with no maintaining operation to reduce shock experienced by the vehicle body at the time of braking operations (which is a great advantage).

The fourth feature of the invention is that the detecting circuit is simple in construction and very inexpensive in manufacturing cost, as the negative pressure in an intake manifold is utilized as the driving source and only the speed of the wheel rotation is detected, which is of great practical value in preventing the skidding of vehicle.

The fifth feature of the invention is the selective availability of an external electrically controlled pattern of signals most suited to the anti-skid braking of the wheels with a hydraulic pressure modulator according to the invention. Therefore, the braking pressure may be freely increased and decreased. Also, the braking pressure may be maintained at a value and may be released, which can be appropriately combined with the above functions of increasing and decreasing the braking pressure. Further, the rate of increase or decrease of the braking pressure may be controlled. Thus, an excellent anti-skid braking performance suitable for changes in various complicated travelling conditions of the vehicle may be obtained, which cannot be achieved with the conventional apparatus and therefore brings a great practical merit in addition to a simple construction and inexpensive manufacturing costs.

BRIEF DESCRIPTION OF THE DRAWINGS

FIGS. 3a to 3g illustrate operational functions of various parts of the embodiments shown in FIGS. 1 and 2;

DESCRIPTION OF THE PREFERRED EMBODIMENTS

Figure 1:
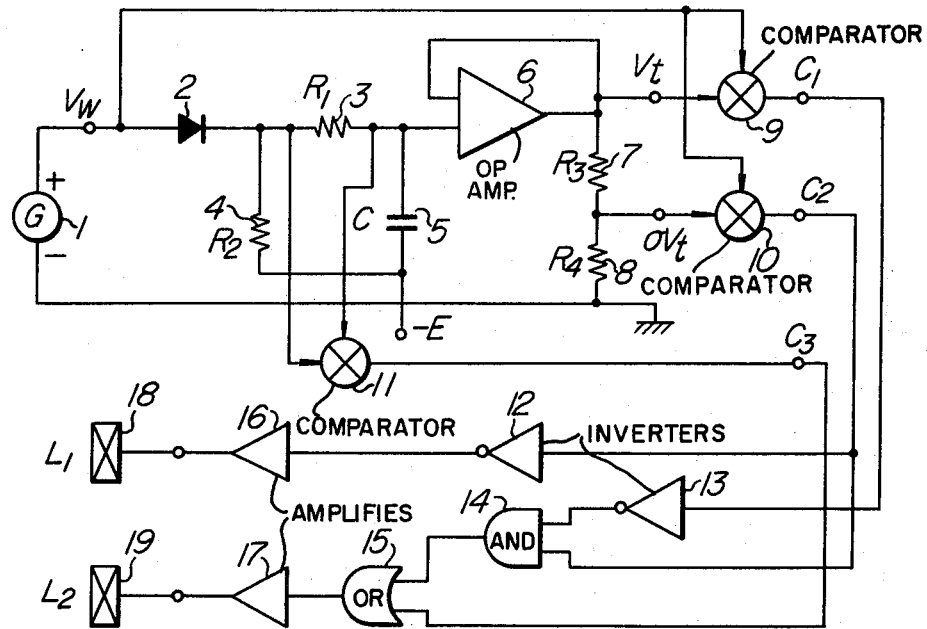
FIG. 1 is a circuit diagram showing the principle of a preferred embodiment of the invention.

The invention is now described in conjunction with preferred embodiments thereof with reference to the accompanying drawings. Referring to FIG. 1, which illustrates the principles of operation of one embodiment of the present invention, numeral 1 designates a wheel rotation speed detector. It may be a DC generator or a combination of a pulse generator which sends out pulses responding to the revolution and a frequency-to-voltage converter, either of the generators being coupled to a wheel or a propeller shaft. Symbol $V_w$ designates the DC output voltage which is proportional to the speed of wheel rotation. Numeral 2 designates a diode. It is assumed to be an ideal diode having zero forward resistance and an infinite reverse resistance. Numerals 3 and 4 designate resistors respectively, and numeral 5 designates a capacitor with a capacitance value C. The resistor 3 serves to detect the charging and discharging of the capacitor and has a resistance value $R_1$, which is made sufficiently low as compared with the resistance value $R_2$ of the resistor 4 so that the time constant $T_1$ which equals $R_1C$ may have a value ($T_1 = 0.001 - 0.0001$ sec) so that it can sufficiently follow the changes in the speed of wheel rotation. The resistor 4 determines the discharge characteristic of the capacitor, with the time constant of $T_2 = (R_1 + R_2) C \approx R_2C$ being so set as to have a voltage drop characteristic with voltage values corresponding to the amount equal to or higher than the actual deceleration of the vehicle, i.e., the deceleration under the optimum braking conditions when the road surface is the least slippery one.

A bias voltage $-E$ is applied to increase the potential difference across the capacitor 5 so that the rate of change of the potential difference across the capacitor attendant on the variation in the voltage proportional to the wheel speed is reduced to make the discharging current flowing through the resistors 3 and 4 substantially constant, thereby making the voltage drop characteristic across the capacitor 5 substantially linear. In other words, the application of the bias voltage $-E$ causes the resistors 3 and 4 to constitute a constant current discharging circuit. Numeral 6 designates an ideal impedance transforming operational amplifier having an infinite input impedance, a zero output impedance and a unity amplification degree. The output voltage is taken as the first reference voltage $V_t$, and it is divided by resistors 7 and 8 to produce the second reference voltage $\sigma V_t$, where $\sigma$ should be determined to match the characteristics of the vehicle and the control system so as to obtain a minimum braking distance ($\sigma$ is preferably 0.95 to 1.00). Numeral 9 designates a comparator with an output $C_1$ being at a level 1 when $V_w$ is equal to $V_t$ and at zero level when $V_w$ is lower than $V_t$. Numeral 10 designates another comparator with an output $C_2$ being at level 1 when $V_w$ is higher than or equal to $\sigma V_t$ and at zero level when $V_w$ is lower than $\sigma V_t$. Numeral 11 designates a differential comparator with an output $C_3$ being at level 1 when the potential at the end of the resistor 3 on the side of the diode 2 is higher than the potential at the end of the resistor 3 on the side of the capacitor 5, that is, when the capacitor 5 is being charged, and with the output $C_3$ being at zero level otherwise. Numerals 12 and 13 designate inverter circuits, 14 an AND circuit, 15 an OR circuit, 16 and 17 solenoid valve drive amplifiers, 18 a solenoid with a coil $L_1$ for increasing and decreasing the hydraulic pressure, and 19 a solenoid with a coil $L_2$ for maintaining the hydraulic pressure.

With respect to the operation of the logical circuits and the amplifiers designated as 12 through 17, when $C_2$ is at zero level ($V_w < \sigma V_t$), the coil $L_1$ is made ON through the inverter circuit 12 and the solenoid valve drive amplifier 16, and otherwise it is OFF. The coil $L_2$ is made ON through the circuit consisting of the inverter 13, the AND circuit 14, the OR circuit 15 and the solenoid valve drive amplifier 17 when $C_1$ is at zero level ($V_w < V_t$) and $C_2$ is at level 1 ($V_w > \sigma V_t$), or also it is made ON through the circuit consisting of the OR circuit 15 and the solenoid valve drive amplifier 17 when $C_3$ is at level 1 (when the capacitor 5 is being charged), and otherwise the coil $L_2$ is OFF.

Figure 2:
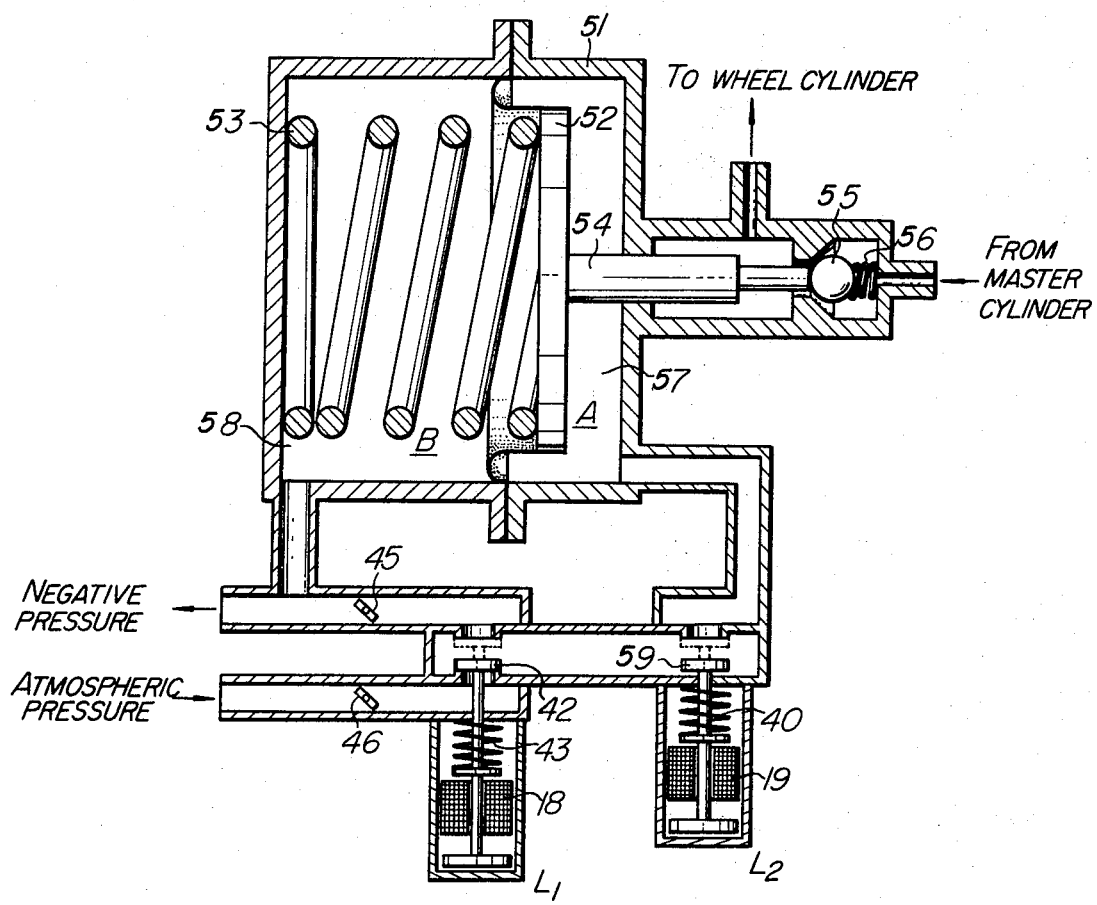
FIG. 2 is a sectional view of an embodiment of the apparatus for controlling the hydraulic braking pressure in accordance with the invention.

FIG. 2 shows the construction of a hydraulic pressure modulator as one of the embodiments of the wheel braking pressure modulator employed in this invention. It comprises a body 51, a diaphragm 52 urged by a tension spring 53 and dividing the inside space into two chambers A and B, a pressure increasing or decreasing rod 54 which is fixed to the diaphragm 52, a ball 55 of a stop valve to stop communication between the master cylinder and the wheel cylinder, a tension spring 56 urging the ball 55, an air-chamber (A) or 57, another air-chamber (B) or 58, a pressure maintaining electromagnetic valve 59 for maintaining the hydraulic pressure including a return spring 40 and a solenoid 19 with a coil $L_2$ for driving the pressure maintaining electromagnetic valve 59, a pressure increasing and decreasing electromagnetic valve 42 including a return spring 43 and a valve drive solenoid 18 with a coil $L_1$, a throttle valve 45 to control the rate of pressure increase and a throttle valve 46 to control the rate of pressure decrease. The negative pressure in the intake manifold and the atmospheric pressure are assumed to be constant in the following description regarding the operation of the apparatus is shown in FIG. 2. The illustrated apparatus shown in a state for normal driving. The diaphragm 52 is at the rightmost position, and the stop valve is open, communicating the master cylinder with the wheel cylinder. There is no current flowing through both the solenoid coil $L_1$ and $L_2$, and both of the electromagnetic valves are at their low positions, so that the chamber A is under a negative pressure. The chamber B is always under the negative pressure through a piping. Wen the driver depresses the brake pedal, the hydraulic brake pressure in increased to urge the pressure control rod 54 more leftward, which movement is, however, too small to close the stop valve on account of the tension spring 53 which presents the leftward displacement of the rod 54. Upon starting the pressure control by causing a current to flow through the solenoid coil $L_1$ the valve 42 is moved to its upper position, communicating the chamber A with the external atmosphere to admit air therein so as to increase the air pressure, thereby moving the diaphragm 52 leftward, so tat the top valve is closed to stop communication between the master cylinder and the wheel cylinder. As the diaphragm continues to move leftward, the hydraulic pressure on the wheel cylinder side begins to decrease. When a current flows through the solenoid coil $L_2$ to move the valve 59 to its upper position, the flow of air into the chamber A is stopped to cease movement of the diaphragm 52 so as to maintain the hydraulic pressure in the wheel cylinder at a value of the instant that the diaphragm movement ceases. Then, by cutting off the current which flows through both the solenoid coils $L_1 L_2$, the chamber A is switched over to communicate with the negative pressure to decrease the air pressure in the chamber A, so that the spring 53 urges the diaphragm back to the right to increase the hydraulic pressure in the wheel cylinder. If, in this course, a current flows again through the coil $L_2$, the chamber A is shut off with the negative pressure therein to stop the diaphragm movement so as to maintain the hydraulic pressure at a value of that time. In this manner, by means of two solenoid actuated valves, the three functions of increasing, decreasing and maintaining the pressure may be attained. Furthermore, it is possible to control the rate of pressure increase and decrease by regulating the air flow rate by means of the throttle valves 45 and 46.

FIGS. 3a to 3g illustrates the functions of various parts in the preceding embodiment of the invention with the abscissa commonly representing time and the ordinate of FIG. 3a taken for voltages, wherein V represents the actual speed of the vehicle (which is indicated by a dashed line, as it is difficult to know surely during the actual braking operation), $V_w$ the wheel rotation speed, $V_t$ the first reference voltage, and $\sigma V_t$ the second reference voltage. With respect to the abscissae of the other figures, in FIG. 3b, it represents the output $C_1$ from the comparator 9; in FIG. 3c, the output $C_2$ from the comparator 10; in FIG. 3d, the output $C_3$ from the comparator 11; in FIG. 3e, the current which flows through the solenoid coil $L_1$; in FIG. 3f, the current which flows through the selenoid coil $L_2$; and, in FIG. 3g, the variation in the hydraulic pressure in the wheel cylinder (hereinafter merely referred to as the hydraulic pressure).

The functions of the method of the present invention are now described according to the lapse of time as illustrated in FIGS. 3a to 3g. The normal driving state is maintained until the time $t_1$, when the driver depresses the brake pedal, the hydraulic pressure begins to increase and the wheel rotation speed represented by $V_w$ becomes lower than the actual vehicle speed represented by V. Until $V_w$ becomes lower than the first reference voltage $V_t$, however, $V_w$ remains equal to $V_t$. Thus, $C_1$ is at level 1, $C_2$ is at level 1, and $C_3$ is at zero level. Therefore, there are no currents flowing through the coils $L_1$ and $L_2$, so that the state of the hydraulic pressure modulator remains unchanged. The hydraulic pressure, however, continues to increase when the brake pedal is continuously depressed. At the time $t_2$, $V_w$ becomes lower than $V_t$, so that the level of $C_1$ is shifted to zero level, while $C_2$ remains at level 1 and $C_3$ at zero level. As a result, the coil $L_2$ becomes ON, while the coil $L_1$ remains OFF, so that the maintaining valve 59 is actuated, however, the stop valve of the hydraulic pressure modulator is not yet closed at the beginning of the control, since it is so constructed that is opened and closed by the displacement of the diaphragm, therefore the hydraulic pressure still continues to increase as the driver continues to depress the brake pedal. When the time $t_3$ is reached, $V_2$ gets lower than $\sigma V_t$, so that this time $C_2$ undergoes a level shift to zero level while $C_1$ and $C_3$ remain at zero levels. As a result, the coil $L_1$ is switched ON and the coil $L_2$ is switched OFF actuating the valve 42 and releasing the valve 59 to admit air into the chamber A so as to move the diaphragm 52 to the left. Consequently, the stop valve is closed, and the hydraulic pressure is then decreased. During the course of such a pressure decrease, the speed of the wheel rotation tends to recover, and $V_w$ gets higher than $\sigma V_t$ at the time $t_4$ when $C_1$ remains at zero level, $C_2$ is switched to level 1, and $C_3$ remains at zero level. As a result, the coil $L_1$ is switched OFF and the coil $L_2$ is switched ON, so that the hydraulic pressure is maintained at a value of that time. The speed of wheel rotation, on the other hand, continues to increase, with $V_w$ becoming equal to $V_t$ at the time 5. At this instant, however, $V_t$ is still much lower than V representing the actual vehicle speed, so it continues to increase, charging the capacitor. Therefore, $C_1$ and $C_3$ under a level shift to level, while $C_2$ remains at level 1, and the coils $L_1$ and $L_2$ remain respectively OFF and ON. Thus, the hydraulic pressure continues to remain constant.

At the time $t_6$ the speed of wheel rotation ceases to increase. (If the hydraulic pressure in zero, the speed of wheel rotation would reach the actual speed of the vehicle. However, as the hydraulic pressure is maintained at a value, the speed of the wheel rotation ceases to increase to remain at a value slightly lower than the actual vehicle speed resulting from a slip caused by the maintained pressure.) The charged capacitor now begins to discharge, so that $C_3$ undergoes a level shift to zero level with $C_1$ and $C_2$ remaining at level 1. As a result, the coil $L_2$ is switched OFF while the coil $L_1$ is maintained OFF to render the chamber A into communication with the negative pressure, whereupon the hydraulic pressure begins to increase again. At the time $t_7$ when $V_w$ gets lower than $V_t$, $C_1$ undergoes a level shift to zero level with $C_2$ remaining at level 1 and $C_3$ at zero level so as to switch the coil $L_2$ ON while maintaining the coil $L_1$ OFF so as to maintain the hydraulic pressure, and the speed of wheel rotation continues to decrease. At the time $t_8$ when $V_w$ gets lower than $\sigma V_t$, $C_2$ undergoes a level shift to zero level with $C_1$ and $C_3$ remaining at zero level so as to switch the coil $L_1$ to be ON and the coil $L_2$ to be OFF. This is the same state at the time $t_3$, and the hydraulic pressure decreases. The states at $t_9$, $t_{10}$, $t_{11}$ and $t_{12}$ are respectively the same as the corresponding previous states at $t_4$, $t_5$, $t_6$ and $t_7$, and similar cycles of operations are repeated until the vehicle stops. As will be observed from FIG. 3, there are a succession of hydraulic pressure changes, such as decreasing, maintaining, increasing, maintaining, again decreasing and so on.

Though in the forgoing embodiment, $V_w$ equals $V_t$ at the peak portions of the curve for $V_w$ as shown in FIG. 3a, it is sometimes preferable to set the parameters involved so that $V_t$ is slightly lower than $V_w$ at peaks of the curve for $V_w$ depending upon the characteristics of the vehicle. In this case, the output $C_1$ from the comparator 9 undergoes a level shift to level 1 when $V_w$ becomes higher than or equal to $V_t$ and to zero level when $V_w$ gets lower than $V_t$. The other functions are entirely the same as above.

Further, similar effects may be obtained by setting the second reference voltage as the difference obtained by subtracting a constant voltage $e$ from the first reference voltage $V_t$, that is, by maintaining the relation that the second reference voltage equals the first reference voltage $V_t$ minus a constant voltage $e$.

An explanation has hereinbefore been made of a case wherein two reference set speeds are to be predetermined, however, in order to achieve the effect of preventing the locking of the vehicle wheels by the repeated operations of maintaining the hydraulic pressure at a predetermined value and automatically renewing the reference speed in accordance with the invention, setting only one reference speed may be employed instead of setting two reference speeds as in the foregoing embodiment.

Figure 4:
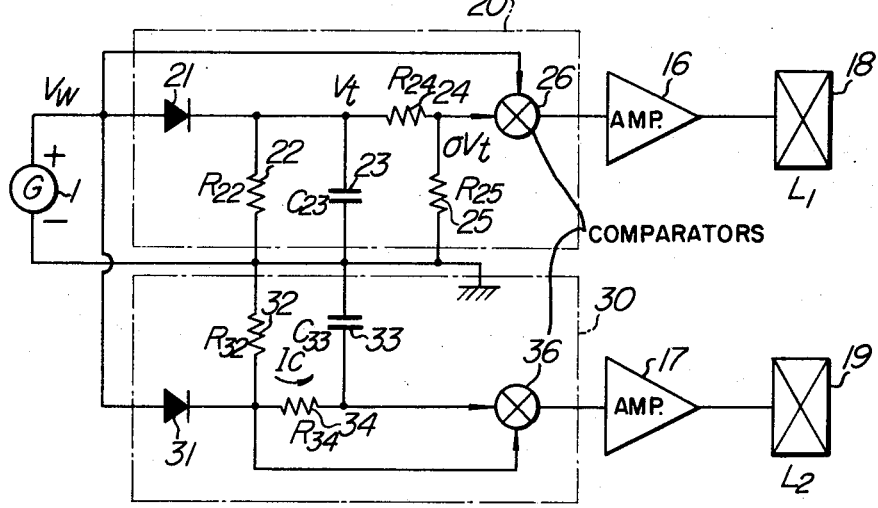
FIG. 4 is a circuit diagram showing the principle of a further embodiment of the invention.
Figure 5:
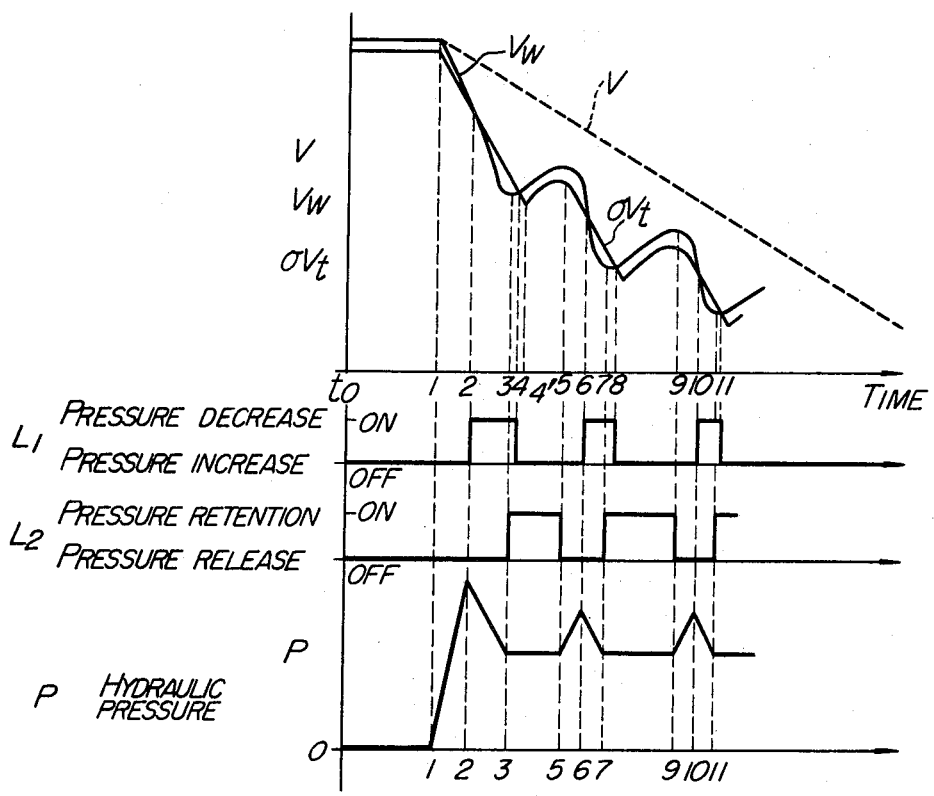
FIG. 5 illustrates the operational functions of various parts of the embodiment shown in FIG. 4.

The circuit diagram of FIG. 4 illustrates the principle of a similar method embodying the invention, in which only reference speed is set, and FIG. 5 shows the imaginery vehicle speed represented by V, the speed of wheel rotation represented by $V_w$, the reference speed represented by $\sigma V_t$, the current flowing through the solenoid coil $L_1$ for increasing and decreasing the pressure, the current flowing through the solenoid coil $L_2$ for maintaining the pressure, and the hydraulic breaking pressure P in the embodiment shown in FIG. 4.

Referring to FIG. 4, numeral 1 designates a generator coupled to at least one vehicle wheel and generating a voltage $V_w$ proportional to the speed of wheel rotation, 20 a pressure decreasing signal generating circuit, 30 a pressure maintaining signal generating circuit. In these circuits, numerals 21 and 31 designate diodes for respectively blocking a reverse current, numeral 22 a resistor for determining the time constant of the discharge of a capacitor 23, numerals 24 and 25 resistors for setting of the reference speed with the respective resistance values $R_{24}$ and $R_{25}$ being sufficiently high as compared with the resistance value $R_{22}$ of the resistor 22, numeral 32 a resistor with a resistance value $R_{32}$ for determining the time constant of the discharge of a capacitor 33, numeral 34 a resistor for detecting the charging and discharging of the capacitor 33 having a resistance value $R_{34}$ sufficiently low as compared with $R_{32}$, numerals 26 and 36 comparators, numerals 16 and 17 amplifiers to amplify the outputs of the respective comparators 26 and 36, and numerals 18 and 19 the same solenoids as already described.

This circuit diagram has been drawn assuming that all the constituent elements of the circuit have ideal electrical characteristics. In the construction of an actual circuit, however, a common practice is to insert an impedance transforming device before the resistor 24 as explained in reference to FIG. 1 in order that the resistance values $R_{24}$ and $R_{25}$ may assume proper working values in accordance with the characteristics of the charging and discharging circuits, the voltage dividing circuit and the comparators. In FIG. 4, such an impedance transforming device is intentionally omitted for the purpose of simplifying the illustration.

In this arrangement, the time constants $T_1$ and $T_2$ for discharging the capacitors 23 and 33 are respectively given by:

$t_1 \approx R_{22}C_{23}$ and $T_2 \approx R_{32}C_{33}$. In the pressure decreasing signal generating circuit 20, while the speed of wheel rotation is increasing, the capacitor 23 is charged by the voltage $V_w$ produced by the generator 1, but when the speed of wheel rotation, hence $V_w$ decreases, the capacitor 23 conversely begins to be discharged. The terminal voltage $V_t$ across the terminals of the capacitor 23 is discharged with the time constant $T_1$. As the resistors 24 and 25 are connected in series between the terminals of the grounded capacitor 23 whereacross the voltage $V_t$ is applied, a voltage $\sigma V_t$ is applied to the comparator 26. The factor $\sigma$ is given by:

$$\sigma = (R_{25}/R_{24} + R_{25}).$$

It may be set to a desired value by suitably selecting the values of $R_{24}$ and $R_{25}$. That is, the reference set speed is thus represented by voltage $\sigma V_t$. The comparator 26 also receives an input voltage $V_w$ representing the speed of wheel rotation, and it compares $V_w$ with $\sigma V_t$ to generate an ON signal when $V_w$ is lower than $\sigma V_t$ so as to energize the solenoid 18 through the amplifier 16, thereby decreasing the braking pressure on the wheels.

While, in the pressure maintaining signal generating circuit 30, the capacitor 33 is similarly charged by the voltage $V_w$ which represents the speed of wheel rotation through the resistor 34 which more or less causes a voltage drop therein. During charging the capacitor 33, a charging current $I_c$ flows through the resistor 34 in the direction of the arrow, so that the opposite ends of the resistor 34 are at different potentials. When the wheels are decelerated the current flowing through the resistor 34 is reversed due to the discharging of the capacitor 33. The comparator 36 discriminates whether the capacitor 33 is being charged or discharged, and it generates an ON signal while the capacitor 33 is charged (namely, during the acceleration of the wheels), while it generates an OFF signal while the capacitor 33 is discharged (namely, during the deceleration). While the speed of wheel rotation is increasing, the comparator 36 energizes the solenoid 19 through the amplifier 17 to maintain the wheel braking pressure at a value of that time.

The sequence of events is now described with reference to FIG. 5, where the abscissa represents time t and the ordinate represents the wheel rotation speed voltage $V_w$, the imaginary vehicle speed voltage V, the reference speed voltage $V_t$, the ON-OFF performances of the coil $L_1$ of the solenoid 18 operating the pressure increasing and decreasing valve 42, those of the coil $L_2$ of the solenoid 19 operating the pressure maintaining valve 59, and that of the hydraulic wheel braking pressure P. When braking is started at the time $t_1$ to decrease $V_w$, the reference speed voltage $\sigma V_t$ is also decreased at a constant deceleration determined by the time constant $T_1$ of the discharge of the capacitor 23. At the time $t_2$, $V_w$ gets lower than $\sigma V_t$, whereupon the comparator 26 generates an ON signal to energize the solenoid 18 of the pressure increasing and decreasing valve 42, thereby decreasing the hydraulic braking pressure P. The hydraulic braking pressure P further continues to decrease until the time $t_3$ is reached, when the wheel rotation speed turns to increase to cause the comparator 36 to generate an ON signal for energizing the solenoid 19 of the pressure maintaining valve 59, thereby maintaining the hydraulic braking pressure P at a value of the time $t_3$. While, in spite of the increase of the wheel rotation speed, the capacitor 23 continues to discharge so long as $V_w$ is lower than $V_t$, and the reference speed voltage continues to decrease until $V_w$ restores to become equal to $V_t$ at the time $t_4'$. With a further increase of $V_w$, the capacitor 23 is switched to be charged, and simultaneously the reference speed voltage $\sigma V_t$ increases. At a little earlier time $t_4$ when $V_w$ gets equal to $\sigma V_t$, the solenoid 18 is switched to become OFF. While the wheels are increasing their speed of rotation, the hydraulic braking pressure P is maintained at a constant value, so the wheel speed increase stops at the time $t_5$ to again turn to decrease, switching the capacitor 23 to start discharging again. At this instant $t_5$, the reference speed voltage also becomes maximum and turns to decrease again at a constant deceleration. Since $V_w$ is higher than $\sigma V_t$ and the capacitor 33 is discharging at this time, both solenoids 18 and 19 are OFF, so the hydraulic braking pressure P begins to increase again. The foregoing successive operations are repeated until the vehicle gradually comes to a stop.

It should, of course, be understood that the factor $\sigma$ may be made unity.

I claim:

1. A control system for preventing the skidding of vehicles provided with a hydraulic brake system including a master cylinder and wheel cylinders operated by a braking hydraulic pressure produced by said master cylinder, said control system comprising:

a braking hydraulic pressure modulator having a first position for supplying the braking hydraulic pressure produced by said master cylinder to said wheel cylinders, a second position for stopping the supply of the hydraulic pressure to said wheel cylinders, a third position for reducing the hydraulic pressure in said wheel cylinders while the supply of the hydraulic pressure thereto is stopped and a fourth position for restoring said reduced hydraulic pressure:

A wheel speed signal generator for generating a signal corresponding to a wheel speed;

means responsive to said wheel speed signal to generate, when a wheel deceleration exceeds a predetermined deceleration, a first set reference wheel speed signal which decreases with a rate of reduction corresponding to said predetermined deceleration starting from a level of the wheel speed signal equal to or lower than that at the time when the wheel deceleration exceeds said predetermined deceleration and a second set reference wheel speed signal which is lower than said first set reference wheel speed signal, said means including means for renewing said first and second set reference wheel speed signals when the wheel speed signal exceeds said first set reference wheel speed signal and changes from an increasing state to a decreasing state; and braking hydraulic pressure modulator actuating means responsive to the wheel speed signal for actuating said braking hydraulic pressure modulator
 a. to said third position for reducing the hydraulic pressure when the wheel speed signal is lower than said second set reference wheel speed signal,
 b. to said second position for stopping the hydraulic pressure supply to maintain the hydraulic pressure level in said wheel cylinders at the time when the wheel speed signal is higher than said second set reference wheel speed signal but lower than said first set reference wheel speed signal or when the wheel speed signal exceeds said first set reference wheel speed signal and is still increasing, and
 c. to said fourth position for restoring the reduced hydraulic pressure or said first position for supplying the hydraulic pressure to increase the hydraulic pressure in said wheel cylinders when the wheel speed signal is higher then said first set reference wheel speed signal and is decreasing.

2. A control system according to claim 1 for use with a said brake system which includes a path through which the braking hydraulic pressure produced by said master cylinder is supplied to the wheel cylinders and wherein said braking hydraulic pressure modulator comprises a stop valve disposed in said path,
a fluid chamber located in said path on the side of the wheel cylinders with respect to said stop valve,
a pressure control rod moving in and out of said fluid chamber,
a diaphragm connected with said rod,
two air chambers separated by said diaphragm,
a conduit for providing communication between said two air chambers,
an electromagnetic valve for stopping, when energized, communication between said conduit and one of said air chambers positioned on the side of said pressure control rod,
an electromagnetic change-over valve for switching, when energized, said conduit to be cut off from communication with the other one of said air chambers and to communicate with atmospheric pressure,
means for bringing said other air chamber into communication with negative pressure,
and a spring for urging said diaphragm to move said pressure control rod into said fluid chamber to open said stop valve by a pushing force of said spring when said two electromagnetic valves are deenergized, whereby said two electromagnetic valves are selectively energized to control air pressures in said two air chambers so that the movement of said pressure control rod is controlled to selectively close said stop valve and to reduce or to restore the braking hydraulic pressure in said path through which the braking hydraulic pressure is supplied to said wheel cylinders.

3. A control system for preventing the skidding of vehicles provided with a hydraulic brake system including a master cylinder and wheel cylinders operated by a braking hydraulic pressure produced by said master cylinder, said control system comprising:

a braking hydraulic pressure modulator capable on actuation of assuming a first position for supplying the braking hydraulic pressure produced by said master cylinder to said wheel cylinders, a second position for stopping the supply of the hydraulic pressure of said wheel cylinders, a third position for reducing the hydraulic pressure in said wheel cylinders while the supply of the hydraulic pressure thereto is stopped and a fourth position for restoring the reduced hydraulic pressure;

a wheel speed signal generator for generating a DC voltage corresponding to a wheel speed;

set reference wheel speed signal generating means comprising
a capacitor,
means for charging said capacitor with a voltage of the wheel speed signal, means for discharging said capacitor at a predetermined rate of discharge and means for dividing a terminal voltage across said capacitor, said terminal voltage across said capacitor forming a first set reference wheel speed signal and an output voltage of said dividing means forming a second set reference wheel speed signal; and braking hydraulic pressure modulator actuating means comprising a first comparator for comparing the wheel speed signal with said first set reference wheel speed signal, a second comparator for comparing the wheel speed signal with said second set reference wheel speed signal and a third comparator for detecting whether or not said capacitor is being charged, said actuating means being operable in accordance with the outputs of said three comparators to actuate said braking hydraulic pressure modulator a. to said third position for reducing the hydraulic pressure when the wheel speed signal is lower than said second set reference wheel speed signal, b. to said second position for stopping the hydraulic pressure supply to maintain the hydraulic pressure level in said wheel cylinders at the time when the wheel speed signal is higher than said second set reference wheel speed signal but lower than said first set reference wheel speed signal and said capacitor is being charged, and c. to said fourth position for restoring the reduced hydraulic pressure or said first position for supplying the hydraulic pressure to increase the hydraulic pressure in said wheel cylinders when the wheel speed signal is higher than said first set reference wheel speed signal and said capacitor is not being charged, wherein said capacitor discharging means comprises a constant current discharging circuit and wherein said constant current discharging circuit comprises a parallel connection of said capacitor and a resistor, one end of said parallel connection being negatively biased.

4. A control system according to claim 3, wherein said wheel speed signal generator generates a signal corresponding to a rotational speed of a propeller shaft for driving the wheels.

5. A control system according to claim 3, wherein said wheel speed signal generator comprises means for detecting a voltage having a frequency proportional to the wheel rotation speed and a frequency-voltage converter for converting said voltage into DC voltage.

6. A control system according to claim 3, wherein said capacitor charging means comprises a diode.

* * * * *

UNITED STATES PATENT OFFICE
CERTIFICATE OF CORRECTION

Patent No. 3,705,748          Dated December 12, 1972

Inventor(s) Takeshi Ochiai

It is certified that error appears in the above-identified patent and that said Letters Patent are hereby corrected as shown below:

In the heading:

[73] Assignee: "Toyota Jidosha Kabushiki Kaisha" should read -- Toyota Jidosha Kogyo Kabushiki Kaisha --

Signed and sealed this 15th day of January 1974.

(SEAL)
Attest:

EDWARD M. FLETCHER, JR.          RENE D. TEGTMEYER
Attesting Officer                Acting Commissioner of Patents